United States Patent
Olson et al.

(10) Patent No.: US 11,758,044 B1
(45) Date of Patent: Sep. 12, 2023

(54) PROMPT LIST CONTEXT GENERATOR

(71) Applicant: Intrado Corporation, Omaha, NE (US)

(72) Inventors: Terry Olson, Bennington, NE (US);
Mark L. Sempek, Blair, NE (US);
Roger Wehrle, Omaha, NE (US)

(73) Assignee: Intrado Corporation, Omaha, NE (US)

( * ) Notice: Subject to any disclaimer, the term of this patent is extended or adjusted under 35 U.S.C. 154(b) by 0 days.

(21) Appl. No.: 16/920,403

(22) Filed: Jul. 2, 2020

(51) Int. Cl.
*H04M 3/00* (2006.01)
*H04M 5/00* (2006.01)
*H04L 12/66* (2006.01)
*H04M 3/493* (2006.01)
*H04M 3/51* (2006.01)

(52) U.S. Cl.
CPC ......... *H04M 3/493* (2013.01); *H04M 3/5166* (2013.01); *H04M 2203/355* (2013.01); *H04M 2203/558* (2013.01)

(58) Field of Classification Search
CPC .. H04M 3/5166; H04M 3/493; H04M 3/4938; H04M 7/006; H04M 2201/42; H04M 3/5183; H04M 3/5232; H04M 2203/2066; H04M 3/523; H04M 3/5175; H04M 3/4936; H04M 2203/256; H04M 2203/355; H04M 3/242; H04M 2203/056; H04M 3/5191; G06F 9/451; G06F 8/34; G06F 40/143; G06F 3/0482; G06F 3/04842; G06F 8/38; G06F 3/167; G06F 8/36; G06F 2201/86
USPC .................. 379/88.01, 88.13, 88.18, 265.09
See application file for complete search history.

(56) References Cited

U.S. PATENT DOCUMENTS

| | | | |
|---|---|---|---|
| 6,504,905 B1 * | 1/2003 | Tsai | G10L 25/69 375/224 |
| 6,721,416 B1 * | 4/2004 | Farrell | H04M 3/51 379/13 |
| 6,721,752 B1 * | 4/2004 | Kislanko | G06F 8/78 |
| 6,944,592 B1 * | 9/2005 | Pickering | G10L 15/22 704/251 |
| 7,206,390 B2 * | 4/2007 | Smith | H04M 1/645 379/88.04 |
| 7,552,054 B1 * | 6/2009 | Stifelman | H04M 3/4938 709/228 |
| 8,503,665 B1 * | 8/2013 | Meisel | H04M 3/4936 379/266.07 |
| 8,681,965 B1 * | 3/2014 | Herrin | H04M 3/4936 379/207.13 |
| 8,719,369 B1 * | 5/2014 | Brown | H04M 3/53383 709/217 |
| 8,832,041 B1 * | 9/2014 | Teh | G06F 16/215 707/690 |
| 9,672,211 B1 * | 6/2017 | Olson | G06F 40/58 |
| 10,740,534 B1 * | 8/2020 | Andrusenko | G06F 16/383 |
| 11,062,693 B1 * | 7/2021 | Olson | G10L 13/00 |
| 2003/0177140 A1 * | 9/2003 | Debard | G06F 8/34 |

(Continued)

*Primary Examiner* — Kharye Pope

(57) ABSTRACT

An example operation may include one or more of receiving a data file comprising a list of interactive voice response (IVR) prompts, identifying a set of IVR prompts within the received data file that are included within a common sequence, assembling text content from each IVR prompt in the set of IVR prompts within the common sequence into a string of text content, and modifying the data file to include the assembled string of text content within a field of the modified data file.

20 Claims, 8 Drawing Sheets

(56) References Cited

U.S. PATENT DOCUMENTS

| | | | |
|---|---|---|---|
| 2005/0144015 A1* | 6/2005 | Agapi | G10L 15/24 |
| | | | 704/278 |
| 2005/0152516 A1* | 7/2005 | Wang | H04M 3/493 |
| | | | 379/88.22 |
| 2006/0184584 A1* | 8/2006 | Dunn | G06F 16/24556 |
| 2006/0203980 A1* | 9/2006 | Starkie | G06F 8/38 |
| | | | 379/88.18 |
| 2007/0140466 A1* | 6/2007 | Sharma | H04M 3/24 |
| | | | 379/235 |
| 2007/0203875 A1* | 8/2007 | Cave | G06F 16/148 |
| 2008/0126941 A1* | 5/2008 | Sharma | G06F 3/167 |
| | | | 715/727 |
| 2010/0107048 A1* | 4/2010 | Takahara | G06F 40/18 |
| | | | 715/219 |
| 2011/0170673 A1* | 7/2011 | Dutta | H04M 3/493 |
| | | | 379/88.04 |
| 2011/0182283 A1* | 7/2011 | Van Buren | H04M 7/0075 |
| | | | 370/352 |
| 2012/0072464 A1* | 3/2012 | Cohen | G06F 16/215 |
| | | | 707/E17.044 |
| 2016/0266752 A1* | 9/2016 | Wu | G06Q 30/016 |
| 2017/0085714 A1* | 3/2017 | Casasola | H04M 3/527 |
| 2018/0165691 A1* | 6/2018 | Heater | G06F 40/205 |
| 2018/0322035 A1* | 11/2018 | Mohanty | G06F 8/70 |
| 2019/0082050 A1* | 3/2019 | Brimshan | H04M 3/493 |
| 2020/0007680 A1* | 1/2020 | Wozniak | H04M 3/493 |
| 2020/0167804 A1* | 5/2020 | Nguyen | H04L 67/1097 |

\* cited by examiner

| Prompt Name (210) | Prompt Text (220) |
|---|---|
| InactiveBal_1 | Are you calling about your outstanding balance? |
| InactiveBal_2 | You have an inactive account having a balance of [account balance] |
| InactiveBal_3 | due today. |
| InactiveBal_4 | originally due today. |
| InactiveBal_5 | due tomorrow. |
| InactiveBal_6 | originally due tomorrow. |
| InactiveBal_7 | originally due yesterday. |
| InactiveBal_8 | due on [payment date]. |
| InactiveBal_9 | originally due on [payment date] |
| InactiveBal_10 | That may include fees for any equipment you have not returned. |

Sorted Prompt Name — 232

| InactiveBal_1 | InactiveBal_10 | InactiveBal_2 | InactiveBal_3 | InactiveBal_4 | InactiveBal_5 | InactiveBal_6 | InactiveBal_7 | InactiveBal_8 | InactiveBal_9 |
|---|---|---|---|---|---|---|---|---|---|
| ⋮ | ⋮ | ⋮ | ⋮ | ⋮ | ⋮ | ⋮ | ⋮ | ⋮ | ⋮ |

200B

Sorted Prompt Name — 234

| InactiveBal_01 | InactiveBal_02 | InactiveBal_03 | InactiveBal_04 | InactiveBal_05 | InactiveBal_06 | InactiveBal_07 | InactiveBal_08 | InactiveBal_09 | InactiveBal_10 |
|---|---|---|---|---|---|---|---|---|---|
| ⋮ | ⋮ | ⋮ | ⋮ | ⋮ | ⋮ | ⋮ | ⋮ | ⋮ | ⋮ |

| Prompt Name (302) | Prompt Text (304) | Seq # (306) | Prompts (308) |
|---|---|---|---|
| BusStopAddress_01 | Ok, here's the address [address playback] | 1 | 4 |
| BusStopAddress_02 | and the city [city playback] | 1 | 4 |
| BusStopAddress_03 | and the state [state playback] | 1 | 4 |
| BusStopAddress_04 | where the bus leaves from. | 1 | 4 |
| DepartOneWay_01 | Ok, here is the address of your departure [address playback] | 2 | 3 |
| DepartOneWay_02 | and the city [city playback] | 2 | 3 |
| DepartOneWay_03 | and the state [state playback] | 2 | 3 |
| DepartOneWayNM_01 | Ok, here is the address of your departure [address playback] | 3 | 3 |
| DepartOneWayNM_02 | and the city [city playback] | 3 | 3 |
| DepartOneWayNM_03 | and the state [state playback] | 3 | 3 |

310 — BusStopAddress rows
320 — DepartOneWay rows
330 — DepartOneWayNM rows

| Prompt Name 302 | Prompt Text 304 | Seq # 306 | Prompts 308 | Dup 340 | Action 342 |
|---|---|---|---|---|---|
| BusStopAddress_01 | Ok, here's the address [address playback] | 1 | 4 | | |
| BusStopAddress_02 | and the city [city playback] | 1 | 4 | | |
| BusStopAddress_03 | and the state [state playback] | 1 | 4 | | |
| BusStopAddress_04 | where the bus leaves from. | 1 | 4 | | |
| DepartOneWay_01 | Ok, here is the address of your departure [address playback] | 2 | 3 | | |
| DepartOneWay_02 | and the city [city playback] | 2 | 3 | yes | context |
| DepartOneWay_03 | and the state [state playback] | 2 | 3 | yes | context |
| DepartOneWayNM_01 | Ok, here is the address [address playback] | 3 | 3 | yes | delete |
| DepartOneWayNM_02 | and the city [city playback] | 3 | 3 | yes | delete |
| DepartOneWayNM_03 | and the state [state playback] | 3 | 3 | yes | delete |

310: BusStopAddress rows
320: DepartOneWay rows
330: DepartOneWayNM rows

| Prompt Name (302) | Prompt Text (304) | English Context (344) |
|---|---|---|
| BusStopAddress_01 | Ok, here's the address [address playback] | |
| BusStopAddress_02 | and the city [city playback] | |
| BusStopAddress_03 | and the state [state playback] | |
| BusStopAddress_04 | where the bus leaves from. | Ok, here's the address [address playback] and the city [city playback] and the state [state playback] where the bus leaves from |
| DepartOneWay_01 | Ok, here is the address of your departure [address playback] | |
| DepartOneWay_02 | and the city [city playback] | |
| DepartOneWay_03 | and the state [state playback] | Ok, here's the address of your departure [address playback] and the city [city playback] and the state [state playback]. |

310 brackets rows BusStopAddress_01–04

320 brackets rows DepartOneWay_01–03

PROMPT LIST CONTEXT GENERATOR

BACKGROUND

Interactive Voice Response (IVR) is a telephony technology allows a human to interact with a computer through the use of voice and touch tone inputs. In some cases, an IVR application may output pre-recorded audio as well as dynamically generated audio that is based on words, or database information collected from a user on the call. For example, an IVR prompt may request a user to repeat or verify a previously spoken input by repeating the same input. IVR uses prompts (e.g., voice prompts) to provide users with information such as instructions and directions for accessing data. For example, an IVR application may include a sequence of prompts which each include sentences, phrases, and individual words that provide greetings and informational messages.

Text content of a sequence of prompts is typically generated in one language for a predetermined jurisdiction. If necessary, the prompt text may be translated for any additional desired jurisdictions. Typically, the text of an IVR prompt is printed or added to a field of a document or file in the format in which it is used/read during a telephone call. However, an IVR prompt is usually just one part of a larger IVR conversation which has been broken up into smaller segments. As a result, a translator does not have the surrounding parts (i.e., context) of the IVR conversation which can help generate a more accurate translation.

SUMMARY

One example embodiment may provide an apparatus that includes a memory, and a processor communicably coupled to the memory and configured to one or more of receive a data file comprising a list of interactive voice response (IVR) prompts, identify a set of IVR prompts within the received data file that are included within a common sequence, assemble text content from each IVR prompt in the set of IVR prompts within the common sequence into a string of text content, and modify the data file to include the assembled string of text content within a field of the modified data file.

Another example embodiment may provide a method that includes one or more of receiving a data file comprising a list of interactive voice response (IVR) prompts, identifying a set of IVR prompts within the received data file that are included within a common sequence, assembling text content from each IVR prompt in the set of IVR prompts within the common sequence into a string of text content, and modifying the data file to include the assembled string of text content within a field of the modified data file.

A further example embodiment may provide a non-transitory computer readable medium comprising instructions, that when read by a processor, cause the processor to perform one or more of receiving a data file comprising a list of interactive voice response (IVR) prompts, identifying a set of IVR prompts within the received data file that are included within a common sequence, assembling text content from each IVR prompt in the set of IVR prompts within the common sequence into a string of text content, and modifying the data file to include the assembled string of text content within a field of the modified data file.

BRIEF DESCRIPTION OF THE DRAWINGS

FIG. 2A is a diagram illustrating a data file including a raw prompt list according to example embodiments.

FIG. 3A is a diagram illustrating a data file including a plurality of sequences of prompts according to example embodiments.

FIG. 3B is a diagram illustrating a labelling process of the plurality of sequence of prompts according to example embodiments.

FIG. 3C is a diagram illustrating a modified prompt list with context added according to example embodiments.

DETAILED DESCRIPTION

Figure 1:
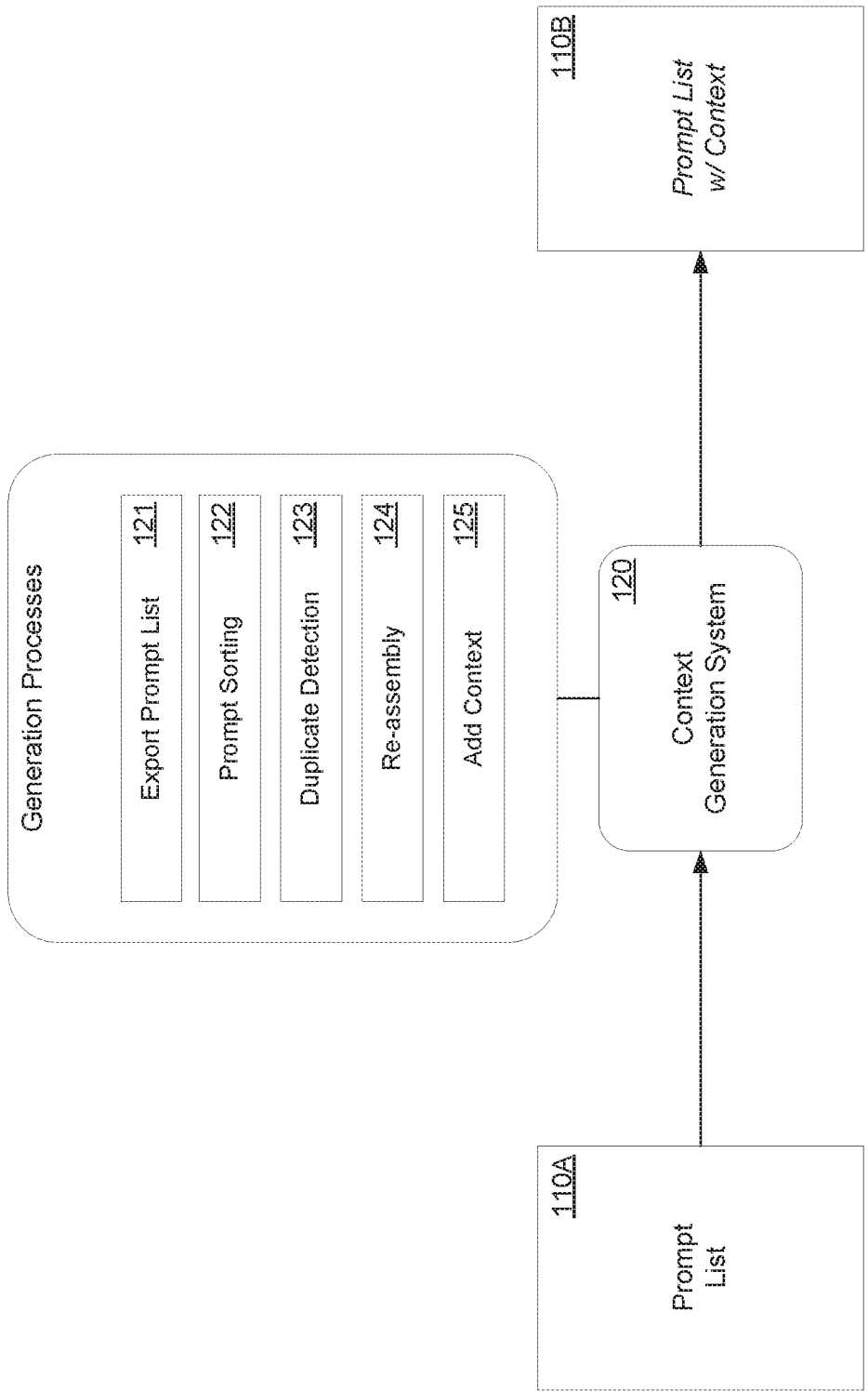
FIG. 1 is a diagram illustrating a prompt list context generation system according to example embodiments.

It will be readily understood that the instant components, as generally described and illustrated in the figures herein, may be arranged and designed in a wide variety of different configurations. Thus, the following detailed description of the embodiments of at least one of a method, apparatus, non-transitory computer readable medium and system, as represented in the attached figures, is not intended to limit the scope of the application as claimed but is merely representative of selected embodiments.

The instant features, structures, or characteristics as described throughout this specification may be combined in any suitable manner in one or more embodiments. For example, the usage of the phrases "example embodiments", "some embodiments", or other similar language, throughout this specification refers to the fact that a particular feature, structure, or characteristic described in connection with the embodiment may be included in at least one embodiment. Thus, appearances of the phrases "example embodiments", "in some embodiments", "in other embodiments", or other similar language, throughout this specification do not necessarily all refer to the same group of embodiments, and the described features, structures, or characteristics may be combined in any suitable manner in one or more embodiments.

In addition, while the term "message" may have been used in the description of embodiments, the application may be applied to many types of network data, such as, packet, frame, datagram, etc. The term "message" also includes packet, frame, datagram, and any equivalents thereof. Furthermore, while certain types of messages and signaling may be depicted in exemplary embodiments they are not limited to a certain type of message, and the application is not limited to a certain type of signaling.

The example embodiments are directed towards a system that can be used to generate translation context for a sequence of prompts of an IVR application. The context can help a translator gather a better and fuller understanding of the phrase to be translated by concatenating prompt text from a sequence of prompts together thereby ensuring accuracy of the translation for each individual prompt in the sequence. A file (e.g., document, spreadsheet, table, etc.) including a prompt list may be input to the system prior to being translated. The prompt list may include sequences of prompts as they are played during the call. That is, each sequence may consist of multiple IVR prompts that are part of a larger conversation with the user. For example, dynamic concatenation (a user's words being replayed) can cause a larger conversation to be broken up into smaller segments. Typically, an IVR prompt will terminate immediately after a playing of a dynamic concatenation, causing the next content to be played in another prompt in sequence.

According to various embodiments, the system may perform a number of operations to combine the prompt text from multiple IVR prompts that are part of a common playback sequence (or menu) into one larger sequential phrase which can then be used as context for a translator. A prompt list may be exported from a software application (e.g., a voice user interface (VUI), etc.) where the prompts are created and used. Within the prompt list may be different sequences of prompts. Each sequence of prompts may include multiple prompts that are used in sequence during an IVR call. Here, the system may identify all prompts that are included in a same sequence, renumber prompt names in the same sequence, and reassemble the prompts in the same sequence. The system may generate a string value that includes all the text from the prompts in the same sequence and store the string value in a field associated with one of the prompts in the sequence (e.g., a last prompt in the sequence, etc.) The string value may be used by the translator to better understand the text within the larger sequence of the IVR prompts during the translation process.

A sequence of IVR prompts, or a partial sequence of IVR prompts, may be a duplicate of another sequence of IVR prompts. In some cases, the system may verify that a sequence of prompts are not a perfect duplicate of another sequence of prompts. If one or more of the prompts within the sequence are different while one or more prompts are duplicates, then the entire sequence may be collected for context. In this case, the duplicate prompts may be removed for translation purposes but maintained for context. If, however, all prompts in a sequence are duplicates of another sequence of prompts, the system may delete the entire duplicate prompt sequence from the prompt list prior to translation.

IVR systems are examples of computer-telephone integration (CTI). For example, a phone may communicate with a computer through the tones that are generated by each key on a telephone keypad. The tones are referred to as dual-tone multi-frequency (DTMF) signals. A computer may use hardware referred to as a telephony board or telephony card to understand DTMF signals produced by a phone. An IVR system may include a computer hooked up to a phone line through a telephony board/card and IVR software. The IVR software allows for pre-recorded greetings that are spoken during the call and menu options that a caller can select. In some cases, the IVR system may also provide video. Furthermore, the IVR system may implement dynamic concatenation which records phrases spoken by a user or data values acquired from a system, storage, etc., during the call and plays them back to the caller (e.g., dates, times, monetary amounts, account numbers, etc.)

An example use case of an IVR application is to route calls within an organization. Instead of relying on a receptionist to answer and route calls, the application can answer incoming calls and route the calls to a correct extensions within an organization. The application can present the user with a list of menu options and questions about the nature of the call. In some cases, the application may answer frequently asked questions. There are many different IVR applications, and the examples herein should not be construed as being limited to any particular type of IVR application.

During generation of the prompt content of an IVR application, a user may generate a spreadsheet, document, or other file which includes a list of prompts for the application. The user may upload the file to the system described herein. For example, the system may be a software tool running on a computing system such as a server, a user device, or the like. The system may receive the file, run different checks on the list of prompts, modify prompts, and output a modified file that is in a format that can be played by the application.

For a list of IVR prompts that are written initially in English (or some other language), they may be transferred to a third party for translation into other languages (e.g., Spanish, French, German, Korean, etc.). However, if the translator works on only the text from a specific IVR prompts, they may be working on only a small phrase from a larger sentence. In this situation, the translator does not have the context from the surrounding words/phrases in the same sentence to help understand the correct translation. The system described herein can identify IVR prompts that have text related to a larger shared sequence, order the text from the IVR prompts together, and generate a string with the ordered text combined. As a result, a translator can view the entire sentence when performing the translation rather than viewing only a small phrase or segment.

FIG. 1 illustrates a context generation system 120 according to example embodiments. Referring to FIG. 1, the context generation system 120 may be running and installed on a host device such as a server, a cloud platform, a database, a user device, and the like. A prompt list 110A may be uploaded via the same device that is hosting the context generation system 120, or via an externally connected device such as a remote user device connected via a network. In this example, the prompt list 110A is uploaded and modified by the context generation system 120 to generate the contextual prompt list 110B that can be used for more accurate translation. Here, the prompt list 110A may be uploaded as a file, a document, a spreadsheet, or the like. An example of the prompt list 110A is shown in FIG. 3A. Referring to FIG. 3A, the prompt list 300A is in a tabular data structure with a plurality of prompts corresponding to the plurality of rows. Each row includes different fields including a prompt name field 302, a prompt text field 304, a sequence number field 306, and a number of prompts field 308. Other fields may be included in the prompt list 300A, and should not be construed as being limited to the fields shown in FIG. 3A. The prompt list 300A may include multiple sequences of prompts (three sequences in this example) from multiple IVR applications that are uploaded at once for context generation.

Referring again to FIG. 1, the context generation system 120 may perform different processes 121-125 on the prompt list 110A to generate the prompt list 100B. In this example, the processes include an export prompt list process 121, a prompt sorting process 122, a duplicate prompt detection process 123, a reassembly process 124, and an add context process 125. These processes are for purposes of example. It should be appreciated that the context generation system 120 may perform different process, some but not all of the process, or the like. Also, there is no specific order in which the processes 121-125 must performed therefore the order can change as desired and processes may also be omitted if desired.

In 121, a prompt list is exported or otherwise entered into the context generation system 120. Here, the prompt list may be exported from another software application such as a VUI design interface, or the like. In 122, the context generation system 120 scans the prompt names of each prompt in a sequence, and may renumber any single-digit prompts. As further described in the examples of FIGS. 2A-2C, single digit prompts can cause incorrect sorting for prompt sequences that involve more than ten (10) prompts. By adding a zero to each prompt name that includes a single digit (i.e., changing '1' to '01'), the system can ensure that a sorting process will list the prompts in correct order. Furthermore, the context generation system 120 sorts the prompts in numerical order.

In 123, the context generation system 120 may determine whether there are any duplicate sequences of prompts and remove them. For example, a duplicate includes a sequence of prompts that are a perfect match with another sequence of prompts. Thus, the perfect duplicate can be removed because there is no reason to perform a duplicate translation. If, however, a second sequence of prompts is only a partial duplicate of a first sequence of prompts, (i.e., one or more prompts in the second sequence are not included in the first sequence, or vice versa) the second sequence of prompts is not removed.

In 124, the context generation system 120 may concatenate the prompt text from the sequence of prompts together based on sequence number at the end of the prompts, which is preceded by an underscore. When the prompt list includes multiple prompt sequences, the context generation system 120 may concatenate each sequence individually, one at a time, etc. When the context generation system 120 identifies a sequence number of '01', it starts concatenating each row's content until the sequence numbers stop increasing by one. In 125, the context generation system 120 adds the concatenated string of text from all prompts in the sequence into a field of a last prompt in the sequence. That is, at the end of a series of prompts in the same sequence, the prompt text from each of the prompts in the sequence is combined into one long string and stored within a field of the prompt list where it can be subsequently used by a translation process.

Figure 2B:
FIGS. 2B-2C are diagrams illustrating sorting operations performed on the prompt list of FIG. 2A, according to example embodiments.
Figure 2C:

FIG. 2A illustrates a data file including a raw prompt list 200A according to example embodiments, and FIGS. 2B-2C illustrate sorting operations performed on the prompt list of FIG. 2A, according to example embodiments. Referring to FIG. 2A, each prompt in the prompt list 200A includes a prompt name 210 and prompt text 220. The prompt list 200A is a simple example which includes one sequence of prompts that consists of ten prompts within the larger sequence. In some cases, the prompts are broken up due to dynamic concatenation. For example, the prompt InactiveBal_2 has a prompt text value that includes the dynamic concatenation [account balance] which corresponds to the system playing back a value detected by the system from the user's account.

In this example, the prompt names 210 include single-digit values. For example, the first nine prompts in the sequence include single-digit values therein. If a sorting operation were to be performed on the prompt list 200A shown in FIG. 2A, the result would be a sorted prompt list 200B shown in FIG. 2B based on sorted prompt names 232. Here, the number '10' is actually sorted ahead of the number '2' by the system, even though the number '10' is greater than the number '2' due to the sorting algorithm performed by the computer. To prevent this from happening, the context generation system can add a zero to each of the single digit values of the prompt name as shown in sorted prompt list 200C of FIG. 2C. Here, prompt names 234 of the sorted prompt list 200C include an extra zero digit that can be added by the context generation system in front of any single digit value within a prompt name. As a result, '02' is sorted ahead of '10'.

As previously mentioned, a VUI design application may be used to perform the dialogue design, foreign language translation and audio recording necessary to produce an IVR program. Within each design are nodes (prompt names/text) that contain playback phrases that apply to a specific caller's situation. In some cases, the prompt text includes dynamic concatenation (DC) that includes pre-recorded phrases such as appointment dates/times, monetary amounts, telephone numbers, recorded speech of the user, etc.

Traditionally, an English version of the prompts is sent to a service for translation into other languages (e.g., Spanish, French, German, Korean, etc.). Many of these prompts are split at a point in a larger playback sequence where the DC is inserted. Testing the completed translation and recording of the foreign language revealed the audio files were less than accurate. If such audio files had that gone live, they would have increased the likelihood of caller confusion and frustration. Thus, it is clear that context and sentence structure is important in the translation and recording process. Many foreign languages construct their sentences with a different structure than US English. Complete phrase context must be included in a sample of phrases employing DC for the resulting translated sentence structure to be correct. The example embodiments provide a system that automatically reassembles the separated phrase sections back into their completed form as context and intended meaning which is stored in the prompt list and provided to a translation service thereby helping ensure accurate translations.

FIG. 3A illustrates a data file including a prompt list 300A with a plurality of sequences (i.e., 310, 320, and 330) of prompts according to example embodiments. Referring to FIG. 3A, the prompt list 300A may include various fields in row and column format. For example, the prompt list 300A may include a prompt name field 302, a prompt text field 304, a sequence number field 306, a number of prompts field 308, and the like. In this example, the prompts are organized into sequences 310, 320, and 330, and each of the prompt names with single digits in the name have been renumbered according to the process shown in FIG. 2C. The sequences 310, 320, and 330, may be generated by a software application such as a VUI design application, or the like. The prompt name 302 includes a textual value that uniquely identifies each prompt in the list 300A by name. Meanwhile, the prompt text field 304 includes a textual value that represents the words that are spoken, played, uttered, etc. during an IVR call.

Furthermore, each sequence may include a unique sequence number/identifier stored in the sequence number field 306. For example, the four prompts included in the first prompt sequence 310 are each labeled with the sequence number '1'. Likewise, the three prompts included in the second prompt sequence 320 are each labeled with the sequence number '2', and the three prompts in the third prompt sequence 330 are labeled with the sequence number '3'. Meanwhile, the number of prompts field 308 includes a numerical value representing the number of prompts in each respective sequence. For example, the first sequence 310 includes four prompts. Thus, each of the four prompts includes a number of prompts value of '4'. Accordingly, each of the prompt sequences 310, 320, and 330, can be identified within the prompt list 300A based on the sequence number field 306 and/or the number of prompts fields 308.

FIG. 3B illustrates a process of adding labels to the prompt list 300A to generate the labeled prompt list 300B, according to example embodiments. Referring to FIG. 3B, the context generation system may identify any duplicate prompt sequences among the prompt sequences 310, 320, and 330. Furthermore, the context generation system may add a label/identifier to the prompt list 300B based on the identification. In this example, the prompt list 300B includes a duplicate identifier field 340 and an action to take field 342. The duplicate identifier field 340 identifies whether a prompt includes matching prompt text within the prompt text field 304 as another prompt on the list 300B. If the prompt is a duplicate, the translator knows not to translate the prompt based on the duplicate identifier field 310. Furthermore, the action to take field 342 includes an action to take when the prompt text is a duplicate. The actions may include use the prompt as context for other prompts in the sequence, or do not use the prompt as context (i.e., delete the prompt all together).

For example, each of the prompts in the first sequence 310 may be the first four prompts examined by the context generation system. Here, none of the prompts are duplicates so nothing is added to the duplicate identified field 310. However, two of the three prompts included in the second sequence 320 are duplicates of prompts in the first sequence. Therefore, these two prompts are labeled as duplicates in the duplicate field 340 by the context generation system. Next, the context generation system determines whether the duplicate prompts should be used for context or deleted. In this example, only some of the prompts in the sequence 320 are duplicates, while one of the prompts is not. Therefore, the context generation system determines to use the partially duplicate prompts as context. Accordingly, the action to take field 342 is labeled with a context identifier.

Meanwhile, the prompts in the third sequence 330 are each duplicates of prompts in the first sequence 310. In other words, the text in the text field 304 of the prompts in the third sequence 330 are duplicates of the text in the text field of prompts in the first sequence 310. Accordingly, all three of the prompts in the third sequence 330 are labeled with duplicate identifiers in the duplicate identification field 340. Furthermore, the context generation system determines to delete all three of the prompts in the third sequence 330 because it is a complete duplicate of a previous sequence 310. Accordingly, a delete identifier is added to the action to take field 342 by the context generation system.

FIG. 3C illustrates a modified prompt list 300C with context added according to example embodiments. Referring to FIG. 3C, the context generation system generates the modified prompt list 300C based on the content included in the labeled prompt list 300B shown in FIG. 3B. In particular, the first sequence 310 is not a duplicate. Therefore, the context generation system concatenates the text strings from the prompt text field 304 in each of the prompts of the first sequence 310, and generates a single context value which is one long string including all of the text of the prompts in the sequence. Furthermore, the context generation system stores the context string in a context field 344 of the last prompt in the first sequence 310 as shown in the prompt list 300C.

Even though the second sequence 320 includes duplicates, the second sequence also includes some unique prompt text. The context generation system detects this from the action to take field 342 in the prompt list 300B. Therefore, the context generate a single context value by concatenating the prompt text from all of the prompts (including the duplicates) in the second sequence 320, and store the single context value in the context field 344 of the last prompt in the second sequence 320 as shown in the prompt list 300C. Meanwhile, the context generation system detects the delete identifier in the action to take field 342 for the prompts in the third sequence 330 of the prompt list 300B, and removes these prompts from the prompt list 300C. The resulting prompt list 300C may be transmitted to a translation service, or stored on a storage device, etc., for subsequent processing.

Figure 4:
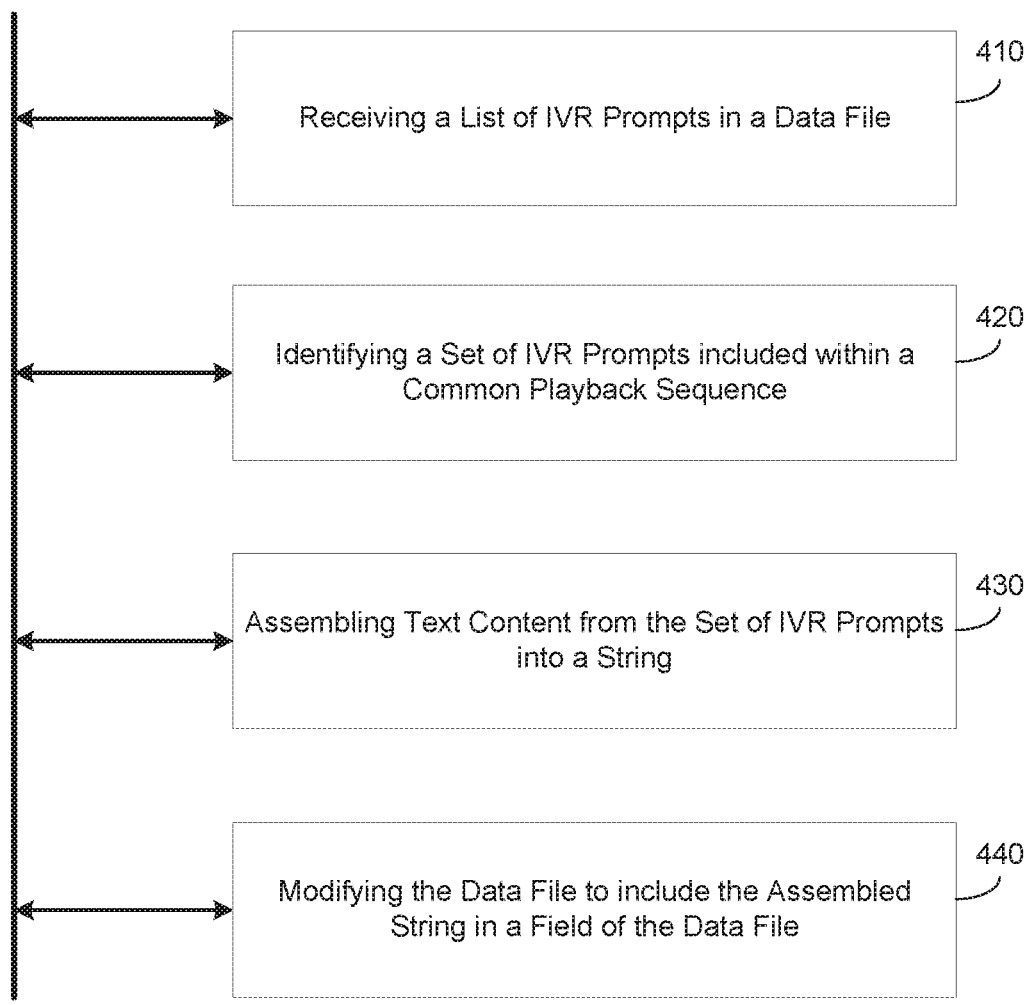
FIG. 4 is a diagram illustrating a method of generating context for a prompt list according to example embodiments.

FIG. 4 illustrates a method 400 a method of generating context for a prompt list according to example embodiments. For example, the method 400 may be performed by a host system such as a computing device, a server, a cloud platform, and the like. Referring to FIG. 4, in 410, the method may include receiving a data file that includes a list of interactive voice response (IVR) prompts. The list may include one or more sequences of IVR prompts that are used during an IVR call.

In 420, the method may include identifying a set of IVR prompts within the received data file that are included within a common sequence. For example, each IVR prompt in a same sequence may be labeled with a common sequence identifier. In 430, the method may include assembling text content from each IVR prompt in the set of IVR prompts within the common sequence into a string of text content. Furthermore, in 440, the method may include modifying the data file to include the assembled string of text content within a field of the modified data file. For example, the string may be stored in a field or row of the prompt list that corresponds to a prompt in the prompt sequence.

In some embodiments, the method may further include modifying prompt names within the identified set of IVR prompts, wherein the modifying the prompt names includes adding a zero to prompt names which only include a single numerical digit. In this example, the method may further include ordering the IVR prompts within the identified set of IVR prompts using the modified prompt names into an ordered sequence and assembling the text content from the ordered sequence.

In some embodiments, the method may further include determining that an IVR prompt within the identified set comprises duplicate text content of another IVR prompt in the received data file, and in response, labelling the determined IVR prompt with a duplicate identifier.

In some embodiments, the method may further include identifying a second set of IVR prompts within the received data file that are included within a different common sequence. In this example, the method may further include determining that text content within each of the second set of IVR prompts are duplicates of text content within another set of IVR prompts within the data file, and labelling each IVR prompt of the second set of IVR prompts with a delete identifier. In this example, the method may further include preventing the second set of IVR prompts from inclusion in the modified data file in response to determining that all IVR prompts within the second set of IVR prompts are duplicate prompts. In some embodiments, the method may further include determining that text content within one or more IVR prompts but not all IVR prompts within the second set of IVR prompts are duplicates of text content within another set of IVR prompts within the data file, and labelling each of the duplicate prompts with a context identifier.

The above embodiments may be implemented in hardware, in a computer program executed by a processor, in firmware, or in a combination of the above. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

An exemplary storage medium may be coupled to the processor such that the processor may read information from, and write information to, the storage medium. In the alternative, the storage medium may be integral to the processor. The processor and the storage medium may reside in an application specific integrated circuit ("ASIC"). In the alternative, the processor and the storage medium may reside as discrete components. For example, FIG. 5 illustrates an example computer system architecture 500, which may represent or be integrated in any of the above-described components, etc.

Figure 5:
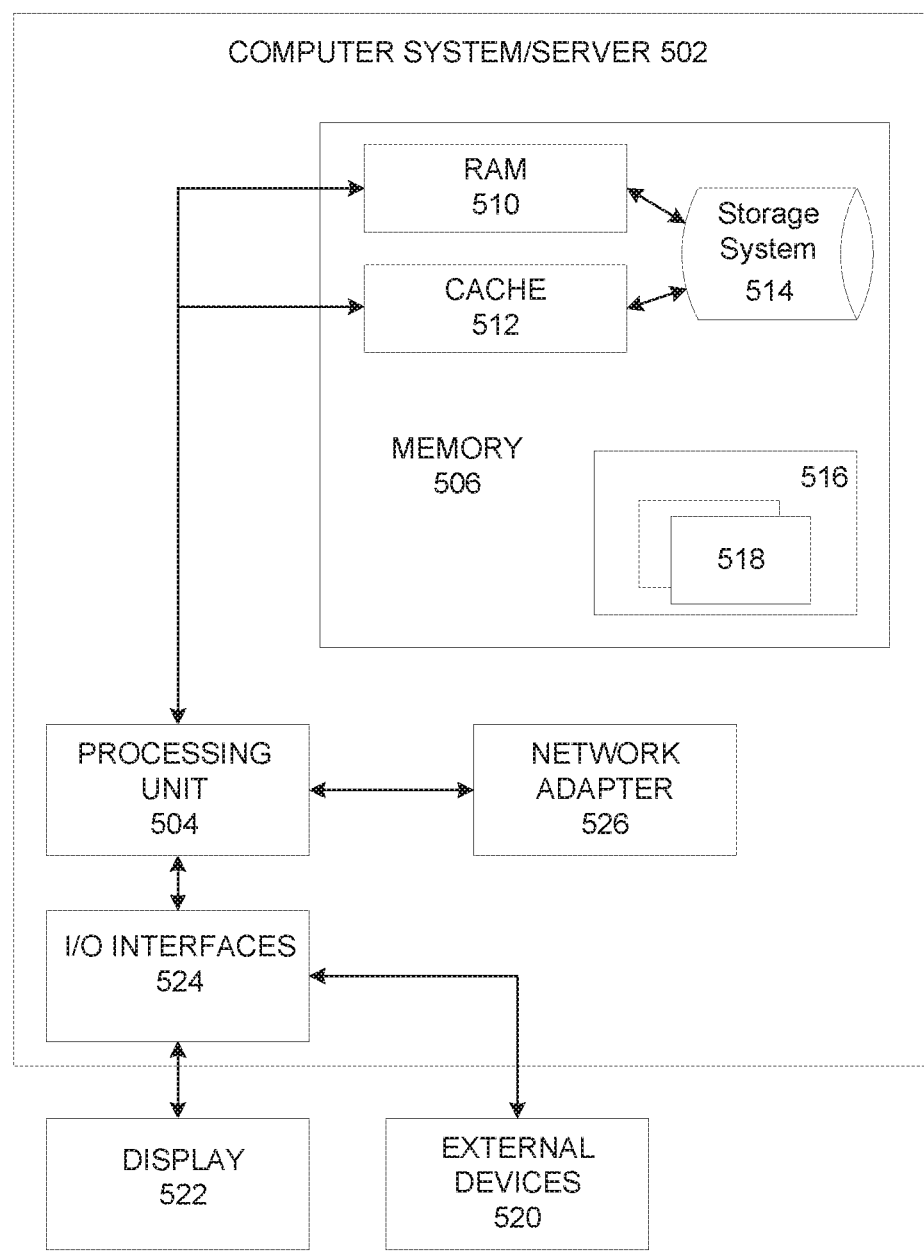
FIG. 5 is a diagram illustrating a computer system configured to support one or more of the example embodiments.

FIG. 5 is not intended to suggest any limitation as to the scope of use or functionality of embodiments of the application described herein. Regardless, the computing node 500 is capable of being implemented and/or performing any of the functionality set forth hereinabove. For example, the computing node 500 may be a network server of a larger enterprise network that connects multiple user workstations to the Internet, a private network, or the like.

In computing node 500 there is a computer system/server 502, which is operational with numerous other general purpose or special purpose computing system environments or configurations. Examples of well-known computing systems, environments, and/or configurations that may be suitable for use with computer system/server 502 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 502 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 502 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 5, computer system/server 502 in cloud computing node 500 is shown in the form of a general-purpose computing device. The components of computer system/server 502 may include, but are not limited to, one or more processors or processing units (processor) 504, a system memory 506, and a bus that couples various system components including the system memory 506 to the processor 504.

The bus represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 502 typically includes a variety of computer system readable media. Such media may be any available media that is accessible by computer system/server 502, and it includes both volatile and non-volatile media, removable and non-removable media. System memory 506, in one embodiment, implements the flow diagrams of the other figures. The system memory 506 can include computer system readable media in the form of volatile memory, such as random-access memory (RAM) 510 and/or cache memory 512. Computer system/server 502 may further include other removable/non-removable, volatile/non-volatile computer system storage media. By way of example only, storage system 514 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus by one or more data media interfaces. As will be further depicted and described below, memory 506 may include at least one program product having a set (e.g., at least one) of program modules that are configured to carry out the functions of various embodiments of the application.

Program/utility 516, having a set (at least one) of program modules 518, may be stored in memory 506 by way of example, and not limitation, as well as an operating system, one or more application programs, other program modules, and program data. Each of the operating system, one or more application programs, other program modules, and program data or some combination thereof, may include an implementation of a networking environment. Program modules 518 generally carry out the functions and/or methodologies of various embodiments of the application as described herein.

As will be appreciated by one skilled in the art, aspects of the present application may be embodied as a system, method, or computer program product. Accordingly, aspects of the present application may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present application may take the form of a computer program product embodied in one or more computer readable medium(s) having computer readable program code embodied thereon.

Computer system/server 502 may also communicate with one or more external devices 520 such as a keyboard, a pointing device, a display 522, etc.; one or more devices that enable a user to interact with computer system/server 502; and/or any devices (e.g., network card, modem, etc.) that enable computer system/server 502 to communicate with one or more other computing devices. Such communication can occur via I/O interfaces 524 (which may be referred to herein as an output and/or an input). Still yet, computer system/server 502 can communicate with one or more networks such as a local area network (LAN), a general wide area network (WAN), and/or a public network (e.g., the Internet) via network adapter 526. As depicted, network adapter 526 communicates with the other components of computer system/server 502 via a bus. It should be understood that although not shown, other hardware and/or software components could be used in conjunction with computer system/server 502. Examples, include, but are not limited to, microcode, device drivers, redundant processing units, external disk drive arrays, RAID systems, tape drives, and data archival storage systems, etc.

Although an exemplary embodiment of at least one of a system, method, and non- transitory computer readable medium has been illustrated in the accompanied drawings and described in the foregoing detailed description, it will be understood that the application is not limited to the embodiments disclosed, but is capable of numerous rearrangements, modifications, and substitutions as set forth and defined by the following claims. For example, the capabilities of the system of the various figures can be performed by one or more of the modules or components described herein or in a distributed architecture and may include a transmitter, receiver or pair of both. For example, all or part of the functionality performed by the individual modules, may be performed by one or more of these modules. Further, the functionality described herein may be performed at various times and in relation to various events, internal or external to the modules or components. Also, the information sent between various modules can be sent between the modules via at least one of: a data network, the Internet, a voice network, an Internet Protocol network, a wireless device, a wired device and/or via plurality of protocols. Also, the messages sent or received by any of the modules may be sent or received directly and/or via one or more of the other modules.

One skilled in the art will appreciate that a "system" could be embodied as a personal computer, a server, a console, a personal digital assistant (PDA), a cell phone, a tablet computing device, a smartphone or any other suitable computing device, or combination of devices. Presenting the above-described functions as being performed by a "system" is not intended to limit the scope of the present application in any way but is intended to provide one example of many embodiments. Indeed, methods, systems and apparatuses disclosed herein may be implemented in localized and distributed forms consistent with computing technology.

It should be noted that some of the system features described in this specification have been presented as modules, in order to more particularly emphasize their implementation independence. For example, a module may be implemented as a hardware circuit comprising custom very large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together but may comprise disparate instructions stored in different locations which, when joined logically together, comprise the module and achieve the stated purpose for the module. Further, modules may be stored on a computer-readable medium, which may be, for instance, a hard disk drive, flash device, random access memory (RAM), tape, or any other such medium used to store data.

Indeed, a module of executable code could be a single instruction, or many instructions, and may even be distributed over several different code segments, among different programs, and across several memory devices. Similarly, operational data may be identified and illustrated herein within modules and may be embodied in any suitable form and organized within any suitable type of data structure. The operational data may be collected as a single data set or may be distributed over different locations including over different storage devices, and may exist, at least partially, merely as electronic signals on a system or network.

It will be readily understood that the components of the application, as generally described and illustrated in the figures herein, may be arranged and designed in a wide variety of different configurations. Thus, the detailed description of the embodiments is not intended to limit the scope of the application as claimed but is merely representative of selected embodiments of the application.

One having ordinary skill in the art will readily understand that the above may be practiced with steps in a different order, and/or with hardware elements in configurations that are different than those which are disclosed. Therefore, although the application has been described based upon these preferred embodiments, it would be apparent to those of skill in the art that certain modifications, variations, and alternative constructions would be apparent.

While preferred embodiments of the present application have been described, it is to be understood that the embodiments described are illustrative only and the scope of the application is to be defined solely by the appended claims when considered with a full range of equivalents and modifications (e.g., protocols, hardware devices, software platforms etc.) thereto.

What is claimed is:

1. An apparatus comprising:
   a memory storing one or more instructions; and
   a processor that when executing the one or more instructions is configured to:
   receive a data file comprising a table with a list of interactive voice response (IVR) prompts stored in a first column;
   identify a set of IVR prompts within the received data file that are included within a common sequence based on prompt identifiers in the table that are assigned to the set of IVR prompts;
   assemble text content from each IVR prompt, in the set of IVR prompts within the common sequence, into a single concatenated string of text content; and
   modify an entry in the table that already includes the last IVR prompt within the common sequence to include the single concatenated string of text content within a field of a second column of the table that is parallel to a field in the first column that stores the last IVR prompt of the common sequence.

2. The apparatus of claim 1, wherein the processor is further configured to:
   modify prompt names within the identified set of IVR prompts, wherein the modifying the prompt names includes adding a zero to prompt names which only include a single numerical digit.

3. The apparatus of claim 2, wherein the processor is further configured to:
   order the IVR prompts within the identified set of IVR prompts using the modified prompt names into an ordered sequence and assemble the text content from the ordered sequence.

4. The apparatus of claim 1, wherein the processor is further configured to:
   determine that an IVR prompt within the identified set comprises duplicate text content of another IVR prompt in the received data file, and in response, label the determined IVR prompt with an identifier that indicates the determined IVR prompt is a duplicate.

5. The apparatus of claim 1, wherein the processor is further configured to:
   identify a second set of IVR prompts within the received data file that are included within a different common sequence.

6. The apparatus of claim 5, wherein the processor is further configured to:
   determine that text content within each of the second set of IVR prompts are duplicates of text content within another set of IVR prompts within the data file, and label each IVR prompt of the second set of IVR prompts with a delete identifier.

7. The apparatus of claim 6, wherein the processor is further configured to:
   prevent the second set of IVR prompts from inclusion in the modified data file in response to determining that all IVR prompts within the second set of IVR prompts are duplicate prompts.

8. The apparatus of claim 5, wherein the processor is further configured to:
   determine that text content within one or more IVR prompts but not all IVR prompts within the second set of IVR prompts are duplicates of text content within another set of IVR prompts within the data file, and label each of the duplicate prompts with a context identifier.

9. A method comprising:
   receiving a data file comprising a table with a list of interactive voice response (IVR) prompts stored in a first column;
   identifying a set of IVR prompts within the received data file that are included within a common sequence based on prompt identifiers in the table that are assigned to the set of IVR prompts;
   assembling text content from each IVR prompt, in the set of IVR prompts within the common sequence, into a single concatenated string of text content; and
   modifying an entry in the table that already includes the last IVR prompt within the common sequence to include the single concatenated string of text content within a field of a second column of the table that is parallel to a field in the first column that stores the last IVR prompt of the common sequence.

10. The method of claim 9, further comprising:
    modifying prompt names within the identified set of IVR prompts, wherein the modifying the prompt names includes adding a zero to prompt names which only include a single numerical digit.

11. The method of claim 10, further comprising:
    ordering the IVR prompts within the identified set of IVR prompts using the modified prompt names into an ordered sequence and assembling the text content from the ordered sequence.

12. The method of claim 9, further comprising:
    determining that an IVR prompt within the identified set comprises duplicate text content of another IVR prompt in the received data file, and in response, labelling the determined IVR prompt with an identifier that indicates the IVR prompt is a duplicate.

13. The method of claim 9, further comprising:
    identifying a second set of IVR prompts within the received data file that are included within a different common sequence.

14. The method of claim 13, further comprising:
    determining that text content within each of the second set of IVR prompts are duplicates of text content within another set of IVR prompts within the data file, and labelling each IVR prompt of the second set of IVR prompts with a delete identifier.

15. The method of claim 14, further comprising:
    preventing the second set of IVR prompts from inclusion in the modified data file in response to determining that all IVR prompts within the second set of IVR prompts are duplicate prompts.

16. The method of claim 13, further comprising:
    determining that text content within one or more IVR prompts but not all IVR prompts within the second set of IVR prompts are duplicates of text content within another set of IVR prompts within the data file, and labelling each of the duplicate prompts with a context identifier.

17. A non-transitory computer-readable medium comprising one or more instructions that when executed by a processor cause the processor to perform:
    receiving a data file comprising a table with a list of interactive voice response (IVR) prompts stored in a first column;
    identifying a set of IVR prompts within the received data file that are included within a common sequence based on prompt identifiers in the table that are assigned to the set of IVR prompts;
    assembling text content from each IVR prompt, in the set of IVR prompts within the common sequence, into a single concatenated string of text content; and
    modifying an entry in the table that already includes the last IVR prompt within the common sequence to include the single concatenated string of text content within a field of a second column of the table that is parallel to a field in the first column that stores the last IVR prompt of the common sequence.

18. The non-transitory computer-readable medium of claim 17, wherein the one or more instructions further cause the processor to perform:
    modifying prompt names within the identified set of IVR prompts, wherein the modifying the prompt names includes adding a zero to prompt names which only include a single numerical digit.

19. The non-transitory computer-readable medium of claim 18, the one or more instructions further cause the processor to perform:
    ordering the IVR prompts within the identified set of IVR prompts using the modified prompt names into an ordered sequence and assembling the text content from the ordered sequence.

20. The non-transitory computer-readable medium of claim 17, the one or more instructions further cause the processor to perform:
    determining that an IVR prompt within the identified set comprises duplicate text content of another IVR prompt in the received data file, and in response, labelling the determined IVR prompt with an identifier that indicates the determined IVR prompt is a duplicate.

* * * * *